(12) United States Patent
Zhang (10) Patent No.: US 12,184,951 B2
(45) Date of Patent: Dec. 31, 2024

(54) VIDEO GENERATION METHOD, APPARATUS, ELECTRONIC DEVICE AND STORAGE MEDIUM

(71) Applicant: Beijing Zitiao Network Technology Co., Ltd., Beijing (CN)

(72) Inventor: Shupeng Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/516,727

(22) Filed: Nov. 21, 2023

(65) Prior Publication Data

US 2024/0089560 A1 Mar. 14, 2024

Related U.S. Application Data

(63) Continuation of application No. PCT/CN2022/094023, filed on May 20, 2022.

(30) Foreign Application Priority Data

May 21, 2021 (CN) .......................... 202110558793.9

(51) Int. Cl.
*H04N 21/81* (2011.01)
*H04N 21/431* (2011.01)
(52) U.S. Cl.
CPC ....... *H04N 21/816* (2013.01); *H04N 21/4312* (2013.01); *H04N 21/8153* (2013.01)
(58) Field of Classification Search
CPC ............. H04N 21/816; H04N 21/4312; H04N 21/8153

(Continued)

(56) References Cited

U.S. PATENT DOCUMENTS

2002/0140988 A1* 10/2002 Cheatle .............. H04N 1/32144
358/402
2020/0336804 A1* 10/2020 Cui .................... H04N 21/4781
(Continued)

FOREIGN PATENT DOCUMENTS

CN 103761062 A 4/2014
CN 107770572 A 3/2018
(Continued)

OTHER PUBLICATIONS

CN-115550550-A_Method for shooting and generating video and related equipment (English) by Cai (Year: 2022).*
(Continued)

*Primary Examiner* — Nathan J Flynn
*Assistant Examiner* — Caroline Somera
(74) *Attorney, Agent, or Firm* — Astute IP Law Group (57) ABSTRACT

The embodiments of the present disclosure provide a video generation method, an apparatus, an electronic device, and a storage medium. The video generation method includes: displaying a capture page, wherein the capture page is used for displaying a target picture captured by a camera to capture a video containing the target picture; in response to existence of element identification information in the target picture, displaying element information of a target video element corresponding to the element identification information in the capture page, wherein the target video element comprises at least one of an effect or a video template; displaying a preview of the target video element, in response to receiving a use operation for the target video element; and generating the video using the target video element, in response to receiving a video generation operation.

15 Claims, 6 Drawing Sheets

(58) Field of Classification Search
USPC .......................................................... 725/116
See application file for complete search history.

(56) References Cited

U.S. PATENT DOCUMENTS

2022/0150345 A1* 5/2022 Woo ..................... G06F 1/1677
2022/0405986 A1   12/2022 Zhang

FOREIGN PATENT DOCUMENTS

| CN | 108388671 | A | * | 8/2018 | ......... G06F 16/9558 |
| CN | 109495684 | A | | 3/2019 | |
| CN | 110780795 | A | * | 2/2020 | |
| CN | 110827378 | A | | 2/2020 | |
| CN | 111263170 | A | * | 6/2020 | ......... H04N 21/2181 |
| CN | 111601039 | A | | 8/2020 | |
| CN | 111831941 | A | | 10/2020 | |
| CN | 112099704 | A | * | 12/2020 | |
| CN | 112689189 | A | * | 4/2021 | |
| CN | 112788275 | A | * | 5/2021 | ....... H04N 21/42653 |
| CN | 113835582 | A | * | 12/2021 | ......... G06F 3/04817 |
| CN | 115550550 | A | * | 12/2022 | |
| JP | 2010098645 | A | | 4/2010 | |
| JP | 2018074431 | A | | 5/2018 | |
| WO | 2021082760 | A1 | | 5/2021 | |

OTHER PUBLICATIONS

International Search Report and Written Opinion of the International Searching Authority in PCT/CN2022/094023, mailed Aug. 3, 2022, 9 pages.
Extended European Search Report for European Patent Application No. 22804055.6, mailed Sep. 4, 2024, 9 pages.
Notice of Refusal for Japanese Patent Application No. 2023-571856, mailed on Oct. 22, 2024, 8 pages.

* cited by examiner

is a Continuation of International Patent Application No. PCT/CN2022/094023, which is based on and claims the benefit of priority of the Chinese patent application No. 202110558793.9 filed on May 21, 2021, the disclosure of both of which are incorporated herein by reference in its entirety.

VIDEO GENERATION METHOD, APPARATUS, ELECTRONIC DEVICE AND STORAGE MEDIUM

This application is a Continuation of International Patent Application No. PCT/CN2022/094023, which is based on and claims the benefit of priority of the Chinese patent application No. 202110558793.9 filed on May 21, 2021, the disclosure of both of which are incorporated herein by reference in its entirety.

TECHNICAL FIELD

The embodiments of the present disclosure relate to the technical field of computers, such as a video generation method, an apparatus, an electronic device, and a storage medium.

BACKGROUND

At present, a user can quickly add friends, make payments or identify effects by scanning codes. For example, the user can instruct the terminal device to display a code scanning page and scan the code to identify an effect, enter the capture page by triggering the effect, and capture a video by using the effect.

However, in the related technology, the way of scanning code to identify effects and capture is complex in operation, and time-consuming, which is not conducive to users to capture videos quickly.

SUMMARY

The embodiments of the present disclosure provide a video generation method, an apparatus, an electronic device, and a storage medium, so as to realize scanning code in a capture page to identify effects and capture, and simplify operations required when scanning code to identify the effects and capture videos.

In a first aspect, some embodiments of the present disclosure provide a video generation method, comprising: displaying a capture page, wherein the capture page is used for displaying a target picture captured by a camera to capture a video containing the target picture; in response to the existence of an element identification information in the target picture, displaying element information of a target video element corresponding to the element identification information in the capture page, wherein the target video element comprises at least one of an effect or a video template; displaying a preview of the target video element, in response to receiving a use operation for the target video element; generating a video using the target video element, in response to receiving a video generation operation.

In a second aspect, some embodiments of the present disclosure further provide a video generation apparatus, comprising: a page display module configured to display a capture page, wherein the capture page is used for displaying a target picture captured by a camera to capture a video containing the target picture; an information display module configured to display element information of a target video element corresponding to element identification information in the capture page in response to existence of an element identification information in the target picture, wherein the target video element comprises at least one of an effect or a video template; a preview display module configured to display a preview of the target video element in response to receiving a use operation for the target video element; a video generation module configured to generate a video by using the target video element in response to receiving a video generation operation.

In a third aspect, some embodiments of the present disclosure further provide an electronic device, comprising: at least one processor; a memory configured to store at least one program, when the at least one processor is executed by the at least one processor, causing the at least one processor to implement the video generation method according to the embodiment of the present disclosure.

In a fourth aspect, the embodiment of the present disclosure further provides a computer-readable storage medium, on which a computer program is stored which, when executed by a processor, implements the video generation method according to the embodiment of the present disclosure.

BRIEF DESCRIPTION OF THE DRAWINGS

Throughout the drawings, the same or similar reference signs refer to the same or similar elements. It should be understood that the drawings are schematic and that the originals and elements are not necessarily drawn to scale.

DETAILED DESCRIPTION

Embodiments of the present disclosure will be described in more detail below with reference to the accompanying drawings.

It should be understood that the various steps recited in the method embodiments of the present disclosure may be performed in a different order, and/or performed in parallel. Moreover, the method embodiments may include additional steps and/or omit performing the illustrated steps. The scope of the present disclosure is not limited in this respect.

The term "comprise" and variations thereof as used herein are intended to be open-ended, i.e., "comprise but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order of functions performed by the devices, modules or units or interdependence thereof.

It is noted that references to "a" or "a plurality of" mentioned in the present disclosure are intended to be illustrative rather than limiting, and those skilled in the art will appreciate that unless otherwise clearly indicated in the context, they should be understood as "at least one".

The names of messages or information exchanged between devices in the embodiments of the present disclosure are for illustrative purposes only, and are not intended to limit the scope of the messages or information.

Figure 1:
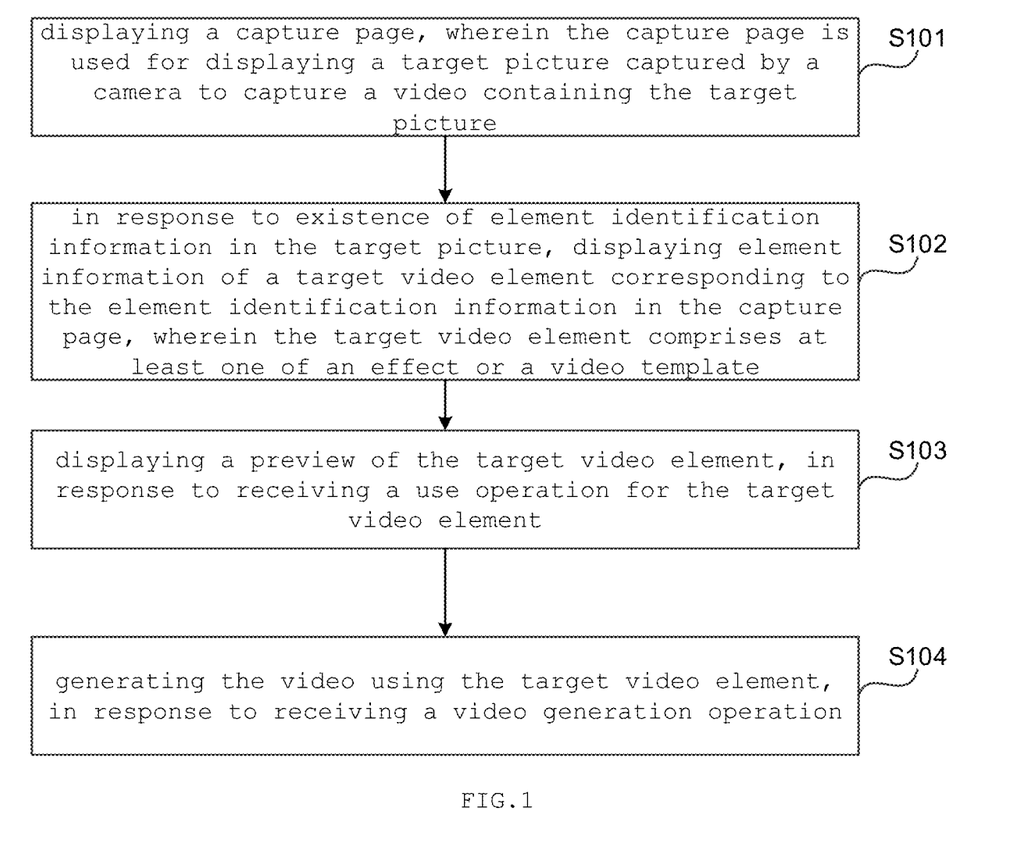
FIG. 1 is a schematic flow diagram of a video generation method provided by some embodiments of the present disclosure.

FIG. 1 is a schematic flow diagram of a video generation method provided by some embodiments of the present disclosure. The method may be performed by a video generation apparatus, wherein the apparatus may be implemented by software and/or hardware, and may be configured in an electronic device, typically a mobile phone or a tablet computer. The video generation method provided by the embodiment of the present disclosure is applicable to a scene of scanning code to identify the video element and generating a video by using the video element. As shown in FIG. 1, the video generation method provided by this embodiment includes the following steps.

S101, displaying a capture page, wherein the capture page is used for displaying a target picture captured by a camera to capture a video containing the target picture.

The capture page can be a page for capture videos and/or photos, and can be displayed in response to a corresponding trigger operation performed by a user for displaying the capture page. The target picture can be a picture captured by a currently turned-on camera (such as a front camera or a rear camera, etc.).

For example, when the electronic device displays other pages except the capture page, if the user wants to capture, a corresponding trigger operation for instructing the electronic device to display the capture page may be executed, such as triggering a capture control displayed in the other pages. Correspondingly, when detecting the triggering operation executed by the user to display the capture page, the electronic device can switch the current display page from the other pages to the capture page, start the camera, display the target picture captured by the camera in the capture page, and switch the currently turned-on camera according to the triggering operation executed by the user to switch the camera, such as switching the currently turned-on front camera (or rear camera) to the rear camera (or front camera) when receiving the triggering operation of switching the camera.

S102, if element identification information exists in the target picture, displaying element information of a target video element corresponding to the element identification information in the capture page, wherein the target video element comprises an effect and/or a video template.

In this embodiment, the element identification information can be identified when the capture page is displayed, and when the element identification information is identified, element information of a target video element corresponding to the identified element identification information is directly displayed in the capture page to prompt the user that the target video element is identified, and it is not necessary to identify the element identification information in other pages (such as a code scanning page) and switch to the capture page to use the target video element, so that the operations required by code scanning identification and video element use can be simplified, and the user experience can be improved.

The element identification information may be identification information of the video element, such as a graphic code of the video element and other image class identification information. Correspondingly, the target video element may be a video element to which the element identification information in the target picture belongs, and the video element may include an effect and/or a video template, wherein the effect may be used to capture a video containing its video effect, and the video template may be used to generate a video containing its video effect using a video material (e.g., a video and/or a picture) selected by the user. The element information of the target video element may include information such as an element icon and/or an element name of the target video element.

Figure 2:
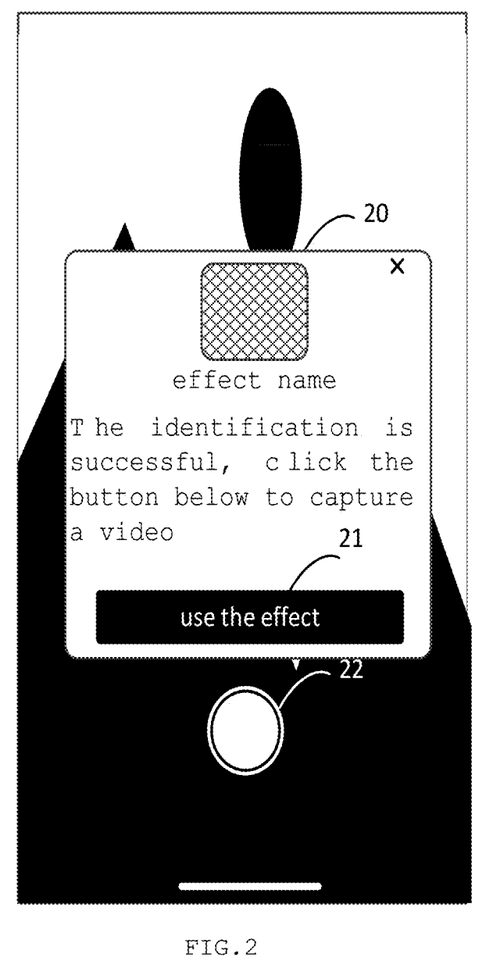
FIG. 2 is a schematic diagram of an element window provided by some embodiments of the present disclosure.

For example, when the capture page is displayed, the target picture captured by the camera can be acquired in real time or periodically (such as every 1 s), such as acquiring a target picture displayed in the capture page in real time or periodically. Whether the target picture contains element identification information corresponding to any video element is determined. Under the condition that the target picture contains the element identification information corresponding to any video element, the element information of the video element (i.e., the target video element) is acquired, and the element information is displayed in the capture page, such as an element window 20 for displaying the video element in the capture page, the element information is displayed in the element window 20, as shown in FIG. 2 (in the figure, taking a target capture element as an effect for example), and return to execute an operation of acquiring a target picture captured by the camera in real time or periodically until the current condition meets a preset ending condition. Under the condition that the target picture does not contain element identification information corresponding to any video element, return to execute the operation of acquiring the target picture captured by the camera in real time or periodically until the current condition meets the preset ending condition. Here, the preset ending condition may be understood as a condition for stopping acquiring a target picture captured by the camera in real time or periodically to determine whether the picture includes the element identification information, which may be set as required, for example, the preset ending condition may be that a current display page is switched from a capture page to another page, a currently turned-on camera is switched from a rear camera to a front camera, and/or a state of the camera is switched from a preview state to a capture state, and so on.

It can be understood that, when multiple pieces of element identification information exist in the target picture, the electronic device may prompt the user and sequentially display the element information of the target video elements corresponding to each piece of element identification information in the target picture, or directly display the element information of the target video elements corresponding to the multiple pieces of element identification information in the target picture in the capture page; the user may also be prompted to select a preset number (for example, 1 or more) of pieces of element identification information from the existing multiple pieces of element identification information, and after the user finishes selection, the element information of the target video element corresponding to the element identification information selected by the user is displayed in the capture page, which may be flexibly set as needed, and this embodiment does not limit this.

In some embodiments, the method further comprises: after the displaying the capture page, determining that the camera is in a preview state; and/or determining that the camera is a rear camera.

In view of that when the camera is in a capture state, the user may want to capture a video more, and when the turned-on camera is a front camera, the user may want to take a selfie more, therefore, in the above embodiment, it may be determined whether the element identification information exists in the target picture only when the camera is in a preview state and/or the turned-on camera is a rear camera, and when it is determined that the element identification information exists in the target picture, the element information of the target video element corresponding to the element identification information is displayed in the capture page, so as to avoid causing excessive interference to the user when the user does not want to identify the target video element based on the target picture, and improve the user experience.

Taking determining whether the element identification information exists in the target picture only when the camera is in a preview state and the camera is a rear camera as an example, when the current condition meets the determination condition of whether the element identification information exists in the target picture, for example, when the current time reaches the time of determining whether the element identification information exists in the target picture, it can be determined whether the camera is in a preview state and the turned-on camera is a rear camera. If the camera is in the preview state and the camera is the rear camera, the target picture captured by the camera is obtained, and whether the element identification information exists in the target picture is determined. If the camera is not in a preview state and/or the turned-on camera is not a rear camera, the operation of acquiring the target picture captured by the camera and determining whether the element identification information exists in the target picture is not executed this time.

S103, displaying a preview of the target video element, in response to receiving a use operation for the target video element.

The use operation may be a trigger operation using the target video element, such as an operation of triggering a use control in an element window, which may be used to instruct the electronic device to display a preview of the target video element.

Taking displaying the element information of the target video element in the element window as an example, as shown in FIG. 2, the electronic device displays an element window 20 of the target video element in the capture page, and displays the element information of the target video element in the element window 20. When a user wants to view the preview of the target video element, the user can trigger use control 21 (i.e., use effect 21 in FIG. 2) in the element window 20. Accordingly, when detecting that the user triggers the use control 21, the electronic device determines that a use operation for the target video element is received, and displays a preview of the target video element in the target video element in response to the use operation.

Figure 3:
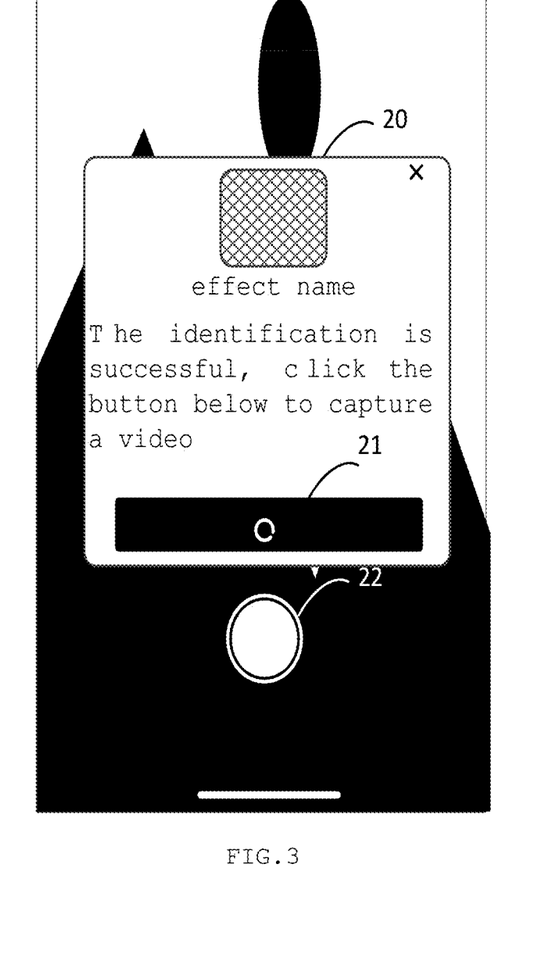
FIG. 3 is a schematic diagram of a download prompt mode provided by some embodiments of the present disclosure.

In this embodiment, when a use operation for the target video element is received, it may be determined whether the target video element has been locally downloaded by the electronic device. In the case that the target video element has been locally downloaded by the electronic device, a preview of the target video element may be displayed in the target video element. In the case that the electronic device does not locally download the target video element, the target video element may be downloaded, and a download prompt is given, as shown in FIG. 3 (taking the target video element as an effect in the figure as an example), and after the downloading is completed, a preview of the target video element is displayed in the target video element. At this time, optionally, the method further includes: before the displaying a preview of the target video element, downloading the target video element and giving a download prompt, in response to that the target video element is not downloaded.

For example, when the target video element is not downloaded locally, the electronic device may generate a resource package acquisition request containing target identification information of the target video element, and send the resource package acquisition request to a server. Accordingly, the server may receive the resource package acquisition request sent by the electronic device, parse the resource package acquisition request to obtain target identification information carried in the resource package acquisition request, acquire a resource package corresponding to the target identification information, and send the resource package to the electronic device sending the resource package acquisition request. Therefore, the electronic device can receive the resource packet sent by the server, parse the resource packet to obtain the configuration information of the target video element, and install and configure the target video element locally according to the configuration information.

S104, generating the video using the target video element, in response to receiving a video generation operation.

The video generation operation may be an operation of generating a video, such as an operation of triggering a capture control 22 (shown in FIG. 2) in a capture page, or an operation of triggering a video generation control.

In this embodiment, the user may generate (e.g., capture or synthesize) a video using the identified target video element.

For example, when the target video element is an effect, the electronic device displays a preview of the target video element in a capture page. When the user wants to capture a video by using the target video element, a capture control in the capture page is triggered (e.g., clicked). Accordingly, when detecting that the user clicks the capture control in the capture page, the electronic device determines that a video generation operation is received, and captures a video containing an element effect of the target video element in response to the video generation operation, such as acquiring a target picture captured by the camera in real time, and synthesizing the target picture with the element effect of the target video element to generate a target video.

When the target video element is a video template, the electronic device may display the preview of the target video element in the capture page, or switch the capture page to a display page of a preview of the target video element, and display the preview of the target video element in the display page. When the user wants to use the target video element to generate a video, the user triggers (e.g., clicks) a material adding control in the capture page or the display page. When detecting that the user triggers the material adding control, the electronic device can display a material selection page for the user to select a video material for generating a video. Therefore, the user can select the video material used for generating the video this time in the material selection page, and trigger a video generation control after the selection is completed. Accordingly, when detecting that the user triggers the video generation control, the electronic device may determine that a video generation operation is received, and in response to the video generation operation, use the video material selected by the user and the element effect of the target video element (i.e., the effect of the video template) to generate a video including the element effect of the target video element.

The video generation method provided by this embodiment displays a capture page, and displays a target picture captured by a camera in the capture page to capture a video containing the used target picture; if the element identification information exists in the target picture, element information of a target video element corresponding to the element identification information is displayed in the capture page, wherein the target video element comprises an effect and/or a video template; a preview of the target video element is displayed when a use operation for the target video element is received; and a video is generated by using the target video element when the video generation operation is received. By adopting the technical solution, this embodiment identifies the element identification information of the video element in the scene of video capture, and directly displays the video element and uses the video element to generate a video in the scene of video capture when the identification is successful, and it is not necessary to identify the element identification information in other pages and switch to the capture page to use the target video element, which can simplify the operations required by code scanning identification and video element use, and improve the user experience.

Figure 4:
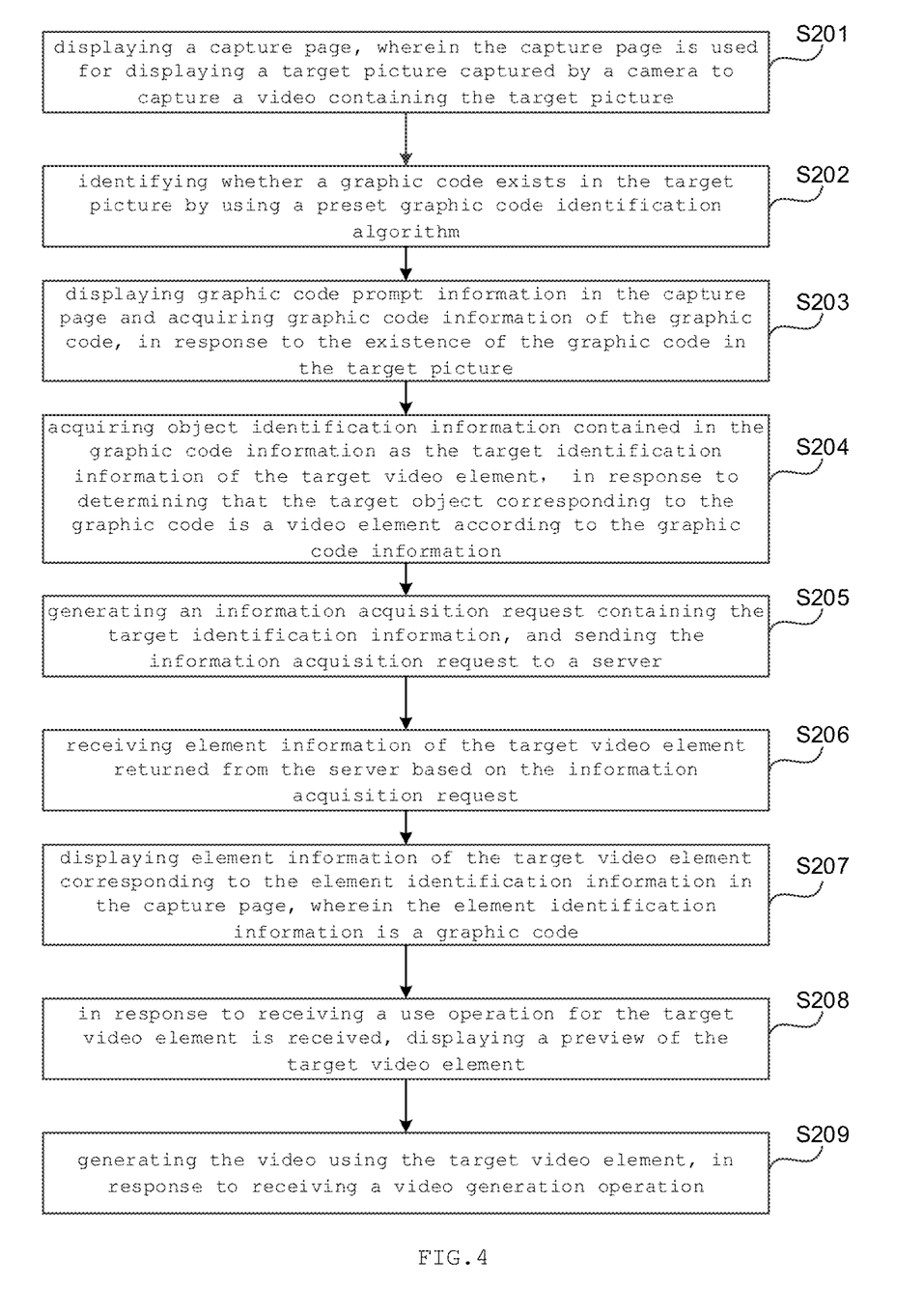
FIG. 4 is a schematic flow diagram of a video generation method provided by some embodiments of the present disclosure.

FIG. 4 is a schematic flow diagram of a video generation method provided by some embodiments of the present disclosure. The solution in this embodiment may be combined with at least one alternative in the above-described embodiments. Optionally, the element identification information is a graphic code, and the method further comprises: after the displaying the capture page, identifying whether a graphic code exists in the target picture by using a preset graphic code identification algorithm; if the graphic code exists in the target picture, displaying graphic code prompt information in the capture page and acquiring graphic code information of the graphic code; if the element identification information exists in the target picture, displaying element information of a target video element corresponding to the element identification information in the capture page, comprising: if a target object corresponding to the graphic code is determined to be a video element according to the graphic code information, taking the target object corresponding to the graphic code as a target video element, and displaying element information of the target video element corresponding to the element identification information in the capture page.

The method further includes: before the displaying the element information of the target video element corresponding to the element identification information in the capture page, acquiring object identification information contained in the graphic code information, and taking the object identification information as target identification information of the target video element; generating an information acquisition request containing the target identification information, and sending the information acquisition request to a server; and receiving element information of the target video element returned from the server based on the information acquisition request.

Accordingly, as shown in FIG. 4, the video generation method provided by this embodiment includes the following steps.

S201, displaying a capture page, wherein the capture page is used for displaying a target picture captured by a camera to capture a video containing the target picture.

S202, identifying whether a graphic code exists in the target picture by using a preset graphic code identification algorithm.

The graphic code may include a graphic identification code such as a two-dimensional code and/or a barcode.

Taking the graphic code as a two-dimensional code as an example, in this embodiment, when a capture page is displayed, a target picture captured by the camera may be acquired, and a preset two-dimensional code identification algorithm is used to identify whether a two-dimensional code exists in the target picture.

S203, if a graphic code exists in the target picture, displaying graphic code prompt information in the capture page, and acquiring the graphic code information of the graphic code.

Correspondingly, if the graphic code does not exist in the target picture, it may be determined that the video element is not identified at the current moment, and the process returns to execute S202 until the current condition meets the preset ending condition, such as until the current display page is switched from the capture page to another page.

The prompt information may be information for prompting the user to identify the graphic code. The graphic code information may be information obtained by parsing the graphic code, such as an information address of the graphic code. The graphic code information of a certain graphic code may include an element category identifier and target identifier information of a target object corresponding to the graphic code.

Figure 5:
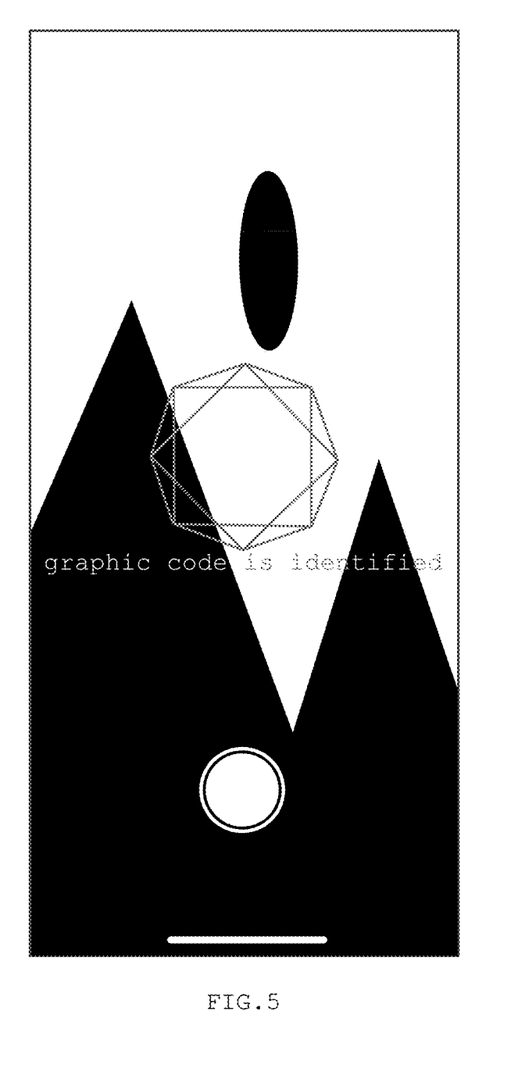
FIG. 5 is a schematic diagram of graphic code prompt information provided by some embodiments of the present disclosure.

For example, when a graphic code exists in the target picture, graphic code prompt information may be displayed in the capture page, as shown in FIG. 5, to prompt the user that the graphic code is identified and obtain the graphic code information of the graphic code, such as parsing the graphic code to obtain the information address of the graphic code.

S204, if the target object corresponding to the graphic code is determined to be a video element according to the graphic code information, acquiring object identification information contained in the graphic code information, and taking the object identification information as the target identification information of the target video element.

The target object may be understood as an object corresponding to the graphic code, that is, an object represented by the graphic code, such as a capture element, an item (including a virtual item), a video, a page or an image, and the like. The object identification information may be information representing the identity of the target object, such as an object ID. Correspondingly, the target identification information may be text identification information such as an element ID of the target video element.

For example, it may be determined whether the target object corresponding to a graphic code in the target picture is a video element according to the acquired graphic code information, that is, it is determined whether the graphic code in the target picture is a graphic code of the video element, and when it is determined that the target object corresponding to the graphic code in the target picture is a video element, the target object is taken as a target video element, and target object identification information is acquired from the graphic code information as the target identification information of the target video element.

In this embodiment, the manner of determining whether the target object corresponding to a graphic code in the target picture is a video element may be flexibly set, for example, the object identification information in the graphic code information of the graphic code may be directly obtained. An information acquisition request or a resource package download request carrying the object identification information is generated, and is sent to a server of application software to which the capture page belongs, so as to acquire object information or a resource package of the target object from the server. If the acquisition is successful, the target object is determined to be a video element, and if the acquisition is unsuccessful, the target object is determined not to be a video element. It is also possible to obtain an object category identifier included in the graphic code information of the graphic code, and it is determined whether the object category identifier is an element category identifier, or it is directly determined whether the graphic code information of the graphic code includes an element category identifier. When the object category identifier is an element category identifier or the graphic code information of the graphic code includes an element category identifier, it is determined that the target object is a video element, and when the object category identifier is not an element category identifier and the graphic code information of the graphic code does not include the element category identifier, it is determined that the target object is not a video element.

In order to simplify the amount of calculation required in the code scanning process, for example, it can be directly determined whether the graphic code information of the graphic code includes an element category identifier. At this time, optionally, the video generation method provided by this embodiment further includes: determining that the target object corresponding to the graphic code is a video element if the graphic code information contains an element category identifier. The element category identifier may be a category identifier of a video element category target object, which may be used to represent that the object classification of the target object is a video element.

S205, generating an information acquisition request containing the target identification information, and sending the information acquisition request to a server.

S206, receiving element information of the target video element returned from the server based on the information acquisition request.

The information acquisition request may be a request for acquiring element information of the target video element.

For example, after acquiring the target identification information of the target video element, the electronic device may generate an information acquisition request carrying the target identification information, and send the information acquisition request to a server, so as to request to acquire the element information of the target video element from the server through the information acquisition request; correspondingly, after receiving the information acquisition request sent by the electronic device, the server may parse the information acquisition request to obtain the target identification information carried in the information acquisition request, acquire element information of the target video element corresponding to the target identification information according to the target identification information, and send the element information to the electronic device sending the information acquisition request. Thus, the electronic device can receive the element information sent by the server as the element information of the target video element.

S207, displaying element information of a target video element corresponding to the element identification information in the capture page, wherein the element identification information is a graphic code, and the target video element comprises an effect and/or a video template.

S208, when a use operation for the target video element is received, displaying a preview of the target video element.

S209, when a video generation operation is received, generating a video by using the target video element.

In this embodiment, by adopting the technical solution, whether the graphic code exists in the target picture is identified, and only when the graphic code exists in the target picture is identified, whether the target object corresponding to the graphic code is a video element is determined according to the graphic code information of the identified graphic code, and when the target object corresponding to the graphic code is determined to be a video element, the element information of the corresponding video element is acquired and displayed according to the target identification information in the graphic code information, which can reduce the amount of calculation required in the process of identifying the video element by scanning code, improve the timeliness of element information display, and improve the user experience.

Figure 6:
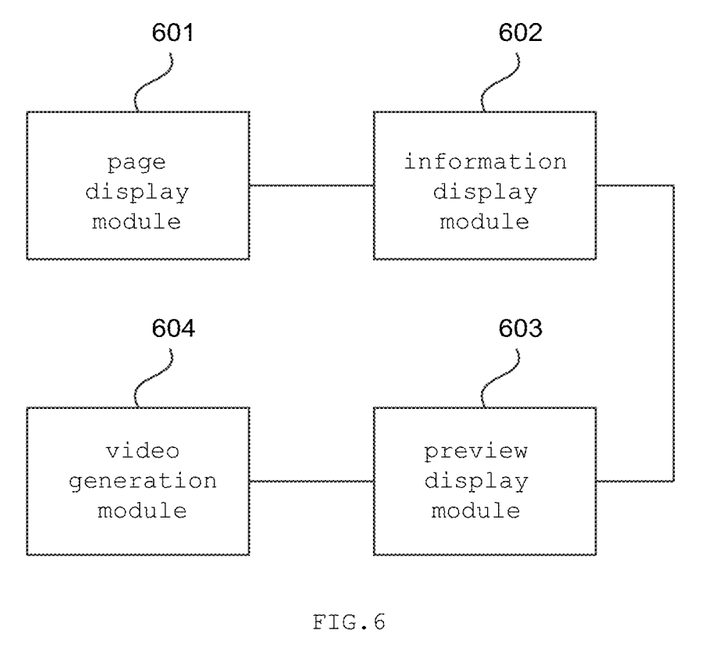
FIG. 6 is a structural block diagram of a video generation apparatus provided by some embodiments of the present disclosure.

FIG. 6 is a structural block diagram of a video generation apparatus provided by some embodiments of the present disclosure. The apparatus may be implemented by software and/or hardware, may be configured in an electronic device, and typically, a mobile phone or a tablet computer, and may generate a video by executing the video generation method. As shown in FIG. 6, the video generation apparatus provided by this embodiment may include: a page display module 601, an information display module 602, a preview display module 603, and a video generation module 604.

The page display module 601 is configured to display a capture page, wherein the capture page is used for displaying a target picture captured by a camera to capture a video containing the target picture.

The information display module 602 is configured to display element information of a target video element corresponding to element identification information in the capture page when the element identification information exists in the target picture, wherein the target video element comprises an effect and/or a video template.

The preview display module 603 is configured to display a preview of the target video element when receiving a use operation for the target video element.

The video generation module 604 is configured to generate a video by using the target video element when receiving a video generation operation.

The video generation apparatus provided by this embodiment displays a capture page through a page display module, and displays a target picture captured by a camera in the capture page; when element identification information exists in the target picture, element information of a target video element corresponding to the element identification information is displayed in the capture page through an information display module, wherein the target video element comprises at least one of an effect or a video template; when a use operation for the target video element is received, a preview of the target video element is displayed through a preview display module; and when a video generation operation is received, a video is generated by using the target video element through a video generation module. By adopting the technical solution, this embodiment identifies the element identification information of the video element in the scene of video capture, and directly displays the video element and uses the video element to generate a video in the scene of video capture when the identification is successful, and it is not necessary to identify the element identification information in other pages and switch to the capture page to use the target video element, which can simplify the operations required by code scanning identification and video element use, and improve the user experience.

In the above solution, the element identification information may be a graphic code, and the video generation apparatus provided by this embodiment may further include: a graphic code identification module configured to identify whether a graphic code exists in the target picture by using a preset graphic code identification algorithm after the displaying the capture page; a first information acquisition module configured to display graphic code prompt information in the capture page and acquire graphic code information of the graphic code when a graphic code exists in the target picture.

The information display module 602 may be configured to: when determining that the target object corresponding to the graphic code is a video element according to the graphic code information, take the target object corresponding to the graphic code as a target video element, and display element information of the target video element corresponding to the element identification information in the capture page.

Optionally, the video generation apparatus provided by this embodiment may further include: an element determination module configured to determine that the target object corresponding to the graphic code is a video element when the graphic code information contains an element category identifier.

Optionally, the video generation apparatus provided by this embodiment may further include: a second information obtaining module configured to acquire object identification information contained in the graphic code information as target identification information of the target video element before the displaying the element information of the target video element corresponding to the element identification information in the capture page; a request module configured to generate an information acquisition request containing the target identification information, and send the information acquisition request to a server; and an information receiving module configured to receive the element information of the target video element returned from the server based on the information acquisition request.

Optionally, the video generation apparatus provided by this embodiment may further include: a camera determination module configured to, after the displaying the capture page, determine that the camera is in a preview state; and/or determine that the camera is a rear camera.

Optionally, the video generation apparatus provided by this embodiment may further include: an download module configured to download the target video element and give a download prompt if the target video element is not downloaded before the displaying the preview of the target video element.

The video generation apparatus provided by the embodiments of the disclosure can execute the video generation method provided by any embodiment of the present disclosure, and has corresponding functional modules for executing the video generation method. For technical details that are not described in detail in this embodiment, reference may be made to the video generation method provided in any embodiment of the present disclosure.

Figure 7:
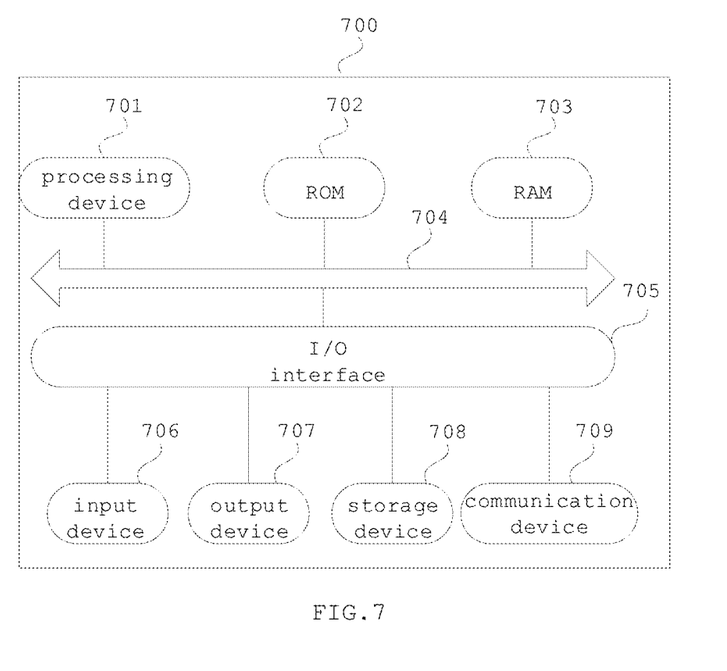
FIG. 7 is a schematic structural diagram of an electronic device provided by some embodiments of the present disclosure.

Referring now to FIG. 7, which shows a schematic structural diagram of an electronic device (e.g., terminal device) 700 suitable for implementing embodiments of the present disclosure. The terminal device in the embodiments of the present disclosure may include, but is not limited to, mobile terminals such as a mobile phone, a notebook computer, a digital broadcast receiver, a Personal Digital Assistant (PDA), a PAD (tablet computer), a Portable Multimedia Player (PMP), a car terminal (e.g., car navigation terminal), and the like, and fixed terminals such as a Digital Television (TV), a desktop computer, and the like. The electronic device shown in FIG. 7 is only an example, and should not bring any limitation to the functions and the scope of the application of the embodiments of the present disclosure.

As shown in FIG. 7, the electronic device 700 may include a processing device (e.g., a central processer, a graphics processor, etc.) 701 that may perform various appropriate actions and processes according to a program stored in a Read-Only Memory (ROM) 702 or a program loaded from a storage device 706 into a Random Access Memory (RAM) 703. In the RAM 703, various programs and data necessary for the operation of the electronic device 700 are also stored. The processing device 701, the ROM 702, and the RAM 703 are connected to each other via a bus 704. An input/output (I/O) interface 705 is also connected to the bus 704.

Generally, the following devices can be connected to the I/O interface 705: an input device 706 including, for example, a touch screen, touch pad, keyboard, mouse, camera, microphone, accelerometer, gyroscope, etc.; an output device 707 including, for example, a Liquid Crystal Display (LCD), speaker, vibrator, etc.; a storage device 706 including, for example, magnetic tape, hard disk, etc.; and a communication device 709. The communication device 709 may allow the electronic device 700 to communicate with other devices wirelessly or by wire to exchange data. While FIG. 7 illustrates an electronic device 700 having various means, it is to be understood that it is not required to implement or provide all of the means shown. More or fewer means may be alternatively implemented or provided.

In particular, the processes described above with reference to the flow diagrams may be implemented as computer software programs, according to the embodiment of the present disclosure. For example, some embodiments of the present disclosure include a computer program product comprising a computer program carried on a non-transitory computer readable medium, the computer program containing program code for performing the method illustrated by the flow diagram. In such embodiments, the computer program may be downloaded and installed from the network via the communication device 709, or installed from the storage device 706, or installed from the ROM 702. When executed by the processing device 701, the computer program performs the above-described functions defined in the method of the embodiments of the present disclosure.

It should be noted that the computer readable medium of the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having at least one wire, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the foregoing. In the present disclosure, a computer readable storage medium may be any tangible medium that contains, or stores a program for use by or in combination with an instruction execution system, apparatus, or device. In contrast, in the present disclosure, a computer readable signal medium may include a data signal propagated in a baseband or as a part of a carrier wave, wherein a computer readable program code is carried therein. Such a propagated data signal may take a variety of forms, including, but not limited to, an electro-magnetic signal, an optical signal, or any suitable combination thereof. A computer readable signal medium may be any computer readable medium other than a computer readable storage medium and the computer readable signal medium can communicate, propagate, or transport a program for use by or in combination with an instruction execution system, apparatus, or device. Program code embodied on a computer readable medium may be transmitted using any appropriate medium, including but not limited to: electrical wires, optical cables, Radio Frequency (RF), etc., or any suitable combination thereof.

In some embodiments, the client and the server can communicate using any currently known or future-developed network protocol, such as HTTP (HyperText Transfer Protocol), and may be interconnected to digital data communication (e.g., a communication network) of any form or medium. Examples of communication networks include a Local Area Network (LAN), a Wide Area Network (WAN), the Internet (e.g., the Internet), and a peer-to-peer network (e.g., ad hoc peer-to-peer network), as well as any currently known or future developed network.

The computer readable medium may be included in the above-mentioned electronic device, or it may exist alone without being assembled into the electronic device.

The computer-readable medium carries at least one program that, when executed by the electronic device, causes the electronic device to: display a capture page, wherein the capture page is used for displaying a target picture captured by a camera to capture a video containing the target picture; if element identification information exists in the target picture, display element information of a target video element corresponding to the element identification information in the capture page, wherein the target video element comprises at least one of an effect or a video template; display a preview of the target video element when a use operation for the target video element is received; and generate a video by using the target video element when a video generation operation is received.

Computer program code for carrying out operations of the present disclosure may be written in one or more programming languages or a combination thereof, the programming languages include, but are not limited to an object oriented programming language such as Java, Smalltalk, C++, and also include conventional procedural programming languages, such as the "C" programming language, or similar programming languages. The program code can be executed entirely on the user's computer, partly on the user's computer, as an independent software package, partly on the user's computer and partly executed on a remote computer, or entirely on the remote computer or server. In the scenario involving a remote computer, the remote computer may be connected to the user's computer through any type of network, including a Local Area Network (LAN) or a Wide Area Network (WAN), or may be connected to an external computer (for example, through the Internet using an Internet service provider).

The flow diagrams and block diagrams in the figures illustrate the architecture, functionality, and operation that are possibly implemented by systems, methods and computer program products according to various embodiments of the present disclosure. In this regard, each block in the flow diagrams or block diagrams may represent a module, program segment, or portion of code, which comprises at least one executable instruction for implementing the specified logical function(s). It should also be noted that, in some alternative implementations, the functions noted in the blocks may also occur in an order different from that noted in the figures. For example, two blocks shown in succession may, in fact, be executed substantially concurrently, or they may sometimes be executed in a reverse order, depending upon the function involved. It will also be noted that each block of the block diagrams and/or flow diagrams, and a combination of blocks in the block diagrams and/or flow diagrams, can be implemented by special purpose hardware-based systems that perform the specified functions or operations, or combinations of special purpose hardware and computer instructions.

The units described in the embodiments of the present disclosure may be implemented by software or hardware. Wherein the name of a unit module does not in some cases constitute a limitation on the unit itself.

The functions described herein above may be performed, at least in part by at least one hardware logic component. For example, without limitation, exemplary types of hardware logic components that may be used include: Field Programmable Gate Array (FPGA), Application Specific Integrated Circuit (ASIC), Application Specific Standard Part (ASSP), System On Chip (SOC), Complex Programmable Logic Device (CPLD), and so forth.

In the context of this disclosure, a machine readable medium may be a tangible medium that can contain, or store a program for use by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on at least one wire, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the foregoing.

In accordance with at least one embodiment of the present disclosure, Example 1 provides a video generation method, comprising: displaying a capture page, wherein the capture page is used for displaying a target picture captured by a camera to capture a video containing the target picture; if element identification information exists in the target picture, displaying element information of a target video element corresponding to the element identification information in the capture page, wherein the target video element comprises an effect and/or a video template; displaying a preview of the target video element when a use operation for the target video element is received; generating a video using the target video element when a video generation operation is received.

According to at least one embodiment of the present disclosure, Example 2 is according to the method of Example 1, wherein the element identification information is a graphic code, the video generation method further comprising: after the displaying the capture page, identifying whether a graphic code exists in the target picture by using a preset graphic code identification algorithm; and if a graphic code exists in the target picture, displaying graphic code prompt information in the capture page, and acquiring graphic code information of the graphic code; if element identification information exists in the target picture, displaying element information of a target video element corresponding to the element identification information in the capture page, comprising: if it is determined that the target object corresponding to the graphic code is a video element according to the graphic code information, taking the target object corresponding to the graphic code as a target video element, and displaying element information of the target video element corresponding to the element identification information in the capture page.

According to at least one embodiment of the present disclosure, Example 3 is according to the method of Example 2, if it is determined that the target object corresponding to the graphic code is a video element according to the graphic code information, comprising: determining that the target object corresponding to the graphic code is a video element if the graphic code information contains an element category identifier.

According to at least one embodiment of the present disclosure, Example 4 is according to the method of Example 2, the video generation method further comprises: before the displaying element information of a target video element corresponding to the element identification information in the capture page, acquiring object identification information contained in the graphic code information as target identification information of the target video element; generating an information acquisition request containing the target identification information, and sending the information acquisition request to a server; receiving element information of the target video element returned from the server based on the information acquisition request.

According to at least one embodiment of the present disclosure, Example 5 is according to the method of any one of Examples 1-4, the video generation method further comprising: after the displaying the capture page, determining that the camera is in a preview state; and/or determining that the camera is a rear camera.

According to at least one embodiment of the present disclosure, Example 6, which is according to the method of any one of Examples 1-4, the video generation method further comprises: before the displaying a preview of the target video element, downloading the target video element and providing a download prompt if the target video element is not downloaded.

In accordance with at least one embodiment of the present disclosure, Example 7 provides a video generation apparatus, comprising: a page display module configured to display a capture page, wherein the capture page is used for displaying a target picture captured by a camera to capture a video containing the target picture; an information display module configured to display element information of a target video element corresponding to element identification information in the capture page when the element identification information exists in the target picture, wherein the target video element comprises an effect and/or a video template; a preview display module configured to display a preview of the target video element when receiving a use operation for the target video element; a video generation module configured to generate a video by using the target video element when receiving a video generation operation.

According to at least one embodiment of the present disclosure, Example 8 is according to the apparatus of Example 7, further comprising: a camera determination module configured to determine that the camera is in a preview state after the displaying a capture page; and/or determine that the camera is a rear camera.

In accordance with at least one embodiment of the present disclosure, Example 9 provides an electronic device, comprising: at least one processor; a memory configured to store at least one program, when the at least one program is executed by the at least one processor, causing the at least one processor to implement the video generation method according to any one of Examples 1-6.

In accordance with at least one embodiment of the present disclosure, Example 10 provides a computer-readable storage medium having stored thereon a computer program which, when executed by a processor, implements the video generation method according to any one of Examples 1-6.

Further, although operations are depicted in a particular order, this should not be understood as requiring such operations to be performed in the particular order shown or in sequential order. Under certain circumstances, multitasking and parallel processing may be advantageous. Likewise, although several specific implementation details are included in the above discussion, these should not be construed as limitations on the scope of the present disclosure. Certain features that are described in the context of a single embodiment can also be implemented in combination in the single embodiment. Conversely, various features that are described in the context of a single embodiment can also be implemented in multiple embodiments separately or in any suitable subcombination.

Although the present subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:
1. A video generation method comprising,
displaying a capture page, wherein the capture page is used for displaying a target picture captured by a camera to capture a video containing the target picture;
in response to existence of element identification information in the target picture, displaying element information of a target video element corresponding to the element identification information in the capture page, wherein the target video element comprises at least one of an effect or a video template;
displaying a preview of the target video element, in response to receiving a use operation for the target video element;
generating the video using the target video element, in response to receiving a video generation operation; and
before displaying the preview of the target video element, downloading the target video element and providing a download prompt in response to that the target video element is not downloaded.
2. The video generation method according to claim 1, wherein the element identification information is a graphic code, and the video generation method further comprises, after the displaying the capture page:
identifying whether the graphic code exists in the target picture by using a preset graphic code identification algorithm; and
displaying graphic code prompt information in the capture page and acquiring graphic code information of the graphic code, in response to the existence of the graphic code in the target picture;

wherein the displaying the element information of the target video element corresponding to the element identification information in the capture page, in response to the existence of the element identification information in the target picture, comprising:
taking a target object corresponding to the graphic code as the target video element and displaying the element information of the target video element corresponding to the element identification information in the capture page, in response to determining that the target object corresponding to the graphic code is a video element according to the graphic code information.

3. The video generation method according to claim 2, further comprising:
determining that the target object corresponding to the graphic code is the video element in response to the graphic code information containing an element category identifier.

4. The video generation method according to claim 2, and the video generation method further comprises, before displaying the element information of the target video element corresponding to the element identification information in the capture page:
acquiring object identification information contained in the graphic code information, and taking the object identification information as target identification information of the target video element;
generating an information acquisition request containing the target identification information, and sending the information acquisition request to a server; and
receiving the element information of the target video element returned from the server based on the information acquisition request.

5. The video generation method according to claim 1, further comprising at least one of the following operations after the displaying the capture page:
determining that the camera is in a preview state; or
determining that the camera is a rear camera.

6. An electronic device comprising:
at least one processor; and
a memory configured to store at least one program, when the at least one program is executed by the at least one processor, causing the at least one processor to implement a video generation method, comprising:
displaying a capture page, wherein the capture page is used for displaying a target picture captured by a camera to capture a video containing the target picture;
in response to existence of element identification information in the target picture, displaying element information of a target video element corresponding to the element identification information in the capture page, wherein the target video element comprises at least one of an effect or a video template;
displaying a preview of the target video element, in response to receiving a use operation for the target video element;
generating the video using the target video element, in response to receiving a video generation operation; and
before displaying the preview of the target video element, downloading the target video element and providing a download prompt in response to that the target video element is not downloaded.

7. The electronic device according to claim 6, wherein the element identification information is a graphic code, and the video generation method further comprises, after the displaying the capture page:
identifying whether the graphic code exists in the target picture by using a preset graphic code identification algorithm; and
displaying graphic code prompt information in the capture page and acquiring graphic code information of the graphic code, in response to the existence of the graphic code in the target picture;
wherein the displaying the element information of the target video element corresponding to the element identification information in the capture page, in response to the existence of the element identification information in the target picture, comprising:
taking a target object corresponding to the graphic code as the target video element and displaying the element information of the target video element corresponding to the element identification information in the capture page, in response to determining that the target object corresponding to the graphic code is a video element according to the graphic code information.

8. The electronic device according to claim 7, wherein the video generation method further comprises:
determining that the target object corresponding to the graphic code is the video element in response to the graphic code information containing an element category identifier.

9. The electronic device according to claim 7, wherein the video generation method further comprises, before displaying the element information of the target video element corresponding to the element identification information in the capture page:
acquiring object identification information contained in the graphic code information, and taking the object identification information as target identification information of the target video element;
generating an information acquisition request containing the target identification information, and sending the information acquisition request to a server; and
receiving the element information of the target video element returned from the server based on the information acquisition request.

10. The electronic device according to claim 6, wherein the video generation method further comprises at least one of the following operations after the displaying the capture page:
determining that the camera is in a preview state; or
determining that the camera is a rear camera.

11. A non-transitory computer-readable storage medium on which a computer program is stored which, when executed by a processor, implements a video generation method, comprising:
displaying a capture page, wherein the capture page is used for displaying a target picture captured by a camera to capture a video containing the target picture;
in response to existence of element identification information in the target picture, displaying element information of a target video element corresponding to the element identification information in the capture page, wherein the target video element comprises at least one of an effect or a video template;
displaying a preview of the target video element, in response to receiving a use operation for the target video element;
generating the video using the target video element, in response to receiving a video generation operation; and
before displaying the preview of the target video element, downloading the target video element and providing a download prompt in response to that the target video element is not downloaded.

12. The non-transitory computer-readable storage medium according to claim 11, wherein the element identification information is a graphic code, and the video generation method further comprises, after the displaying the capture page:

identifying whether the graphic code exists in the target picture by using a preset graphic code identification algorithm; and displaying graphic code prompt information in the capture page and acquiring graphic code information of the graphic code, in response to the existence of the graphic code in the target picture;

wherein the displaying the element information of the target video element corresponding to the element identification information in the capture page, in response to the existence of the element identification information in the target picture, comprising:

taking a target object corresponding to the graphic code as the target video element and displaying the element information of the target video element corresponding to the element identification information in the capture page, in response to determining that the target object corresponding to the graphic code is a video element according to the graphic code information.

13. The non-transitory computer-readable storage medium according to claim 12, wherein the video generation method further comprises:

determining that the target object corresponding to the graphic code is the video element in response to the graphic code information containing an element category identifier.

14. The non-transitory computer-readable storage medium according to claim 12, wherein the video generation method further comprises, before displaying the element information of the target video element corresponding to the element identification information in the capture page:

acquiring object identification information contained in the graphic code information, and taking the object identification information as target identification information of the target video element;

generating an information acquisition request containing the target identification information, and sending the information acquisition request to a server; and receiving the element information of the target video element returned from the server based on the information acquisition request.

15. The non-transitory computer-readable storage medium according to claim 11, wherein the video generation method further comprises at least one of the following operations after the displaying the capture page:

determining that the camera is in a preview state; or determining that the camera is a rear camera.

\* \* \* \* \*